US011240459B2

(12) United States Patent
Nicolas

(10) Patent No.: US 11,240,459 B2
(45) Date of Patent: Feb. 1, 2022

(54) IR PIXEL RECONFIGURABLE IN DI OR BDI MODE

(71) Applicant: COMMISSARIAT A L'ENERGIE ATOMIQUE ET AUX ENERGIES ALTERNATIVES, Paris (FR)

(72) Inventor: Jean-Alain Nicolas, Grenoble (FR)

(73) Assignee: COMMISSARIAT A L'ENERGIE ATOMIQUE ET AUX ENERGIES ALTERNATIVES, Paris (FR)

(*) Notice: Subject to any disclaimer, the term of this patent is extended or adjusted under 35 U.S.C. 154(b) by 0 days.

(21) Appl. No.: 17/082,083

(22) Filed: Oct. 28, 2020

(65) Prior Publication Data
US 2021/0136306 A1 May 6, 2021

(30) Foreign Application Priority Data
Nov. 5, 2019 (FR) .................. 19 12366

(51) Int. Cl.
H04N 5/378 (2011.01)
H04N 5/3745 (2011.01)
(Continued)

(52) U.S. Cl.
CPC .............. H04N 5/378 (2013.01); G01J 5/061 (2013.01); H04N 5/33 (2013.01); H04N 5/3698 (2013.01); H04N 5/3745 (2013.01)

(58) Field of Classification Search
CPC ...... H04N 5/33; H04N 5/3698; H04N 5/3745; H04N 5/378; G01J 5/061; G01J 5/22; G01J 2005/202
See application file for complete search history.

(56) References Cited

U.S. PATENT DOCUMENTS 4,862,002 A * 8/1989 Wang .................. G01J 5/28 250/352
8,878,595 B2 * 11/2014 Sun ..................... G01J 5/02 327/434

(Continued)

FOREIGN PATENT DOCUMENTS

WO WO 2015/093826 A1 6/2015

OTHER PUBLICATIONS

French Preliminary Search Report dated Jul. 13, 2020 in French Application 19 12366 filed on Nov. 5, 2019 (with English Translation of Categories of Cited Documents), 2 pages.

(Continued)

Primary Examiner — Lin Ye
Assistant Examiner — Chriss S Yoder, III
(74) Attorney, Agent, or Firm — Oblon, McClelland, Maier & Neustadt, L.L.P.

(57) ABSTRACT

External biasing control unit for a reading circuit of an infrared photodetector element, the control unit being able to adopt:
- a first configuration wherein it sends a first set of biasing signals to a first stage of the reading circuit so that this first stage adopts a first operating mode corresponding to a first biasing mode of the photodetector, in particular a direct injection mode,
- a second configuration wherein it sends a second set of biasing signals to said first stage, the signals in the second set being designed so that said first stage adopts a second operating mode corresponding to a second biasing mode of the photodetector, in particular a buffer direct injection mode.

12 Claims, 6 Drawing Sheets

(51) Int. Cl.
G01J 5/06 (2006.01)
H04N 5/33 (2006.01)
H04N 5/369 (2011.01)

(56) References Cited

U.S. PATENT DOCUMENTS

| | | | |
|---|---|---|---|
| 9,191,586 B2 | 11/2015 | Minlong | |
| 9,215,386 B2 | 12/2015 | Elkind et al. | |
| 2015/0153231 A1* | 6/2015 | Sun | G01J 5/10 |
| | | | 250/349 |
| 2020/0029042 A1* | 1/2020 | Rhee | H04N 5/378 |

OTHER PUBLICATIONS

Hsieh et al., "Focal-Plane-Arrays and CMOS Readout Techniques of Infrared Imaging Systems", IEEE Transactions on Circuits and Systems for Video Technology, vol. 7, No. 4, Aug. 1, 1997, pp. 594-605.

Yao "CMOS readout circuit design for infrared image sensors", Proceedings of SPIE, International Symposium on Photoelectronic Detection and Imaging 2009, vol. 7384, Jul. 3, 2009, 11 pages.

* cited by examiner

IR PIXEL RECONFIGURABLE IN DI OR BDI MODE

TECHNICAL FIELD

The present invention relates to the field of infrared imaging devices, and in particular to that of cooled infrared imagers, and relates to the reading circuit of photodetector elements, as well as to the biasing thereof.

PRIOR ART

When a scene is observed by an infrared imager formed by a matrix of detection elements, each detection element delivers a current proportional to the illumination received by this element.

A conventional structure of an infrared detection element IR is illustrated in FIG. 1. The detection element includes a photodiode 2 associated with and connected to a circuit 4 for reading a signal generated by the photodiode 2, also referred to as a "reading pixel". The current issuing from the photodiode 2 is integrated by means of a capacitor Cint over a predefined period of time. Thus, at the end of this period, each reading pixel 4 supplies information on the part of the scene observed by the photodiode 2 with which it is associated.

The state of a scene observed can therefore be followed by means of the voltage at the terminals of the capacitor Cint. The current emitted by the photodiode 2 passes, in the example illustrated, through a so-called direct injection (DI) structure that serves to bias the photodiode 2 in a suitable manner and reaches the capacitor $C_{int}$. The DI structure may be in the form of a transistor 5, which makes it possible to maintain a fixed biasing on the photodiode 2 during the current integration by the storage capacitor Cint and to isolate the photodiode 2 from the variations in voltage at the terminals of the capacitor Cint.

The input impedance Rin of the DI structure, which represents its ability to maintain a fixed biasing voltage despite variations in current of the photodiode 2, can be expressed by the following simplified formula;

$$R_{in} \approx \frac{n \cdot k \cdot T}{q \cdot I_d}$$

This approximation is due to the fact that the current levels in the photodiode 2 are low and that the transistor 5 is typically biased in a weak reversal mode. The input impedance Rin is therefore here inversely proportional to the current of the photodiode 2 and is independent of the size of the transistor 5. The smaller the pitch of the pixels in the matrix and therefore the lower the currents generated, the higher is this input impedance Rin.

A good performance indicator of a detection element is the injection efficiency thereof, which gives the ratio between the current that enters, which is therefore integrated on the storage capacitor Cint, and the current generated by the photodiode 2. However, an increase in the input impedance Rin will cause a deterioration in the injection efficiency. Statically, this may result in signal losses, so that the entire current generated will not join the integration capacitor Cint, as well as non-linearities, while dynamically the reading circuit has a tendency not to react to rapid variations in signal.

FIG. 2 gives a different structure of a reading circuit 40 associated with the photodiode 2. The DI structure has been replaced by a so-called BDI structure 41, standing for "buffer direct injection". This structure 41 comprises a biasing transistor 45 or so-called direct injection transistor coupled to the photodiode 2 and to the integration capacitor $C_{int}$, with which an amplifier 46 of gain A is this time associated, in particular a differential amplifier an input of which is connected to a source electrode of the transistor 45 of the direct injection transistor. The output governs the gate voltage of the biasing transistor 45. The source of the transistor 45 being connected to a terminal of the photodiode, there is therefore a negative feedback established on a signal serving to bias the photodiode 2.

Such an architecture meets the need for reduction in the input impedance of the reading circuit since it can allow a reduction by a factor A (A being the gain of the amplifier) compared with the use of a DI structure. However, the BDI structure may this time pose a problem of unnecessary power consumption in certain cases.

It is therefore difficult to be able to reconcile the two criteria mentioned above.

The document U.S. Pat. No. 9,215,386 B2 presents a particular reading circuit for a detection element of an imager, this reading circuit being reconfigurable and capable of adopting a configuration among a plurality of configurations according to the type of detection that it is wished to perform and/or the image resolution that it is wished to obtain. This possibility of reconfiguration of the reading circuit is achieved to the detriment of the size of the pixel since the reading circuit then itself requires numerous components in order to be able to adopt several distinct operating modes. Such a solution would therefore not apply well to current infrared images, where it is more and more sought to reduce the size thereof.

The problem is posed of finding a novel infrared imaging device that is improved vis-à-vis the drawback or drawbacks mentioned above.

DESCRIPTION OF THE INVENTION

An embodiment of the present application provides an external biasing control unit for at least one reading circuit of at least one infrared photodetector, this control unit being reconfigurable between a first configuration and a second configuration and vice versa, the first configuration being a configuration wherein the biasing control unit is configured to send a first set of biasing signals to a first transistor stage of the reading circuit so that this first stage adopts a first operating mode, corresponding in particular to a first biasing mode of the photodetector, in particular of the direct injection type, the second configuration being a configuration wherein this control block is configured to send a second set of biasing signals to said first transistor stage of the reading circuit, the signals in the second set being designed so that said first stage adopts a second operating mode corresponding to a second biasing mode of the photodetector, in particular a biasing mode of the direct injection type.

Thus it is a biasing control unit external to the detection elements the configuration of which has just been modified in order to be able to change from one biasing mode to the other without necessarily having to add a component to the reading pixel.

Thus one aspect of the present invention relates to an infrared imaging device including a plurality of detection elements, each detection element comprising a photodetector associated with and connected to a pixel for reading a signal generated by the photodetector, the reading pixel being provided with an integration capacitive load for storing charges coming from the photodetector, the reading pixel comprising a first stage, coupled to the photodetector and to the integration capacitive load, said first stage being provided with transistors and serving for biasing the photodetector, the imaging device being provided with at least one biasing control unit external to said plurality of detection elements, said external biasing control unit being able to apply, to said first stage of the reading pixel, a set of biasing potentials, the external biasing control unit being reconfigurable so as to be able to change from a first configuration to a second configuration and from the second configuration to the first configuration, the first configuration being a configuration wherein the biasing control unit is configured to send a first set of biasing signals to said first stage so that said first stage adopts a first operating mode corresponding to a first biasing mode of the photodetector.

The second configuration is a configuration wherein the control unit is configured to send a second set of biasing signals to said first stage, the signals in the second set being different from the signals in the first set and designed so that said first transistor stage adopts a second operating mode corresponding to a second biasing mode of the photodetector.

The first biasing mode of the photodetector is typically a direct injection (DI) biasing mode, while said second biasing mode of the photodiode is typically a buffer direct injection (BDI) biasing mode of the photodetector.

In the direct injection mode a set of transistors of the first stage are biased so that said reading pixel has a first input impedance, while in the buffer direct injection mode said set of transistors of said first stage are biased so that said reading pixel has a second input impedance lower than the first impedance.

An external biasing control unit makes it possible to individually configure the detection elements in DI or BDI mode. With an external control unit, the DI or BDI configuration of a detection element is not necessarily related to that of an adjacent detection element. With the external biasing control unit it is possible to configure two adjacent or neighbouring detection elements in the same row (line or column) of a detection element.

Advantageously, the first stage may be formed by a first so-called direct injection transistor connected to the photodetector and to the integration capacitive load, a second transistor and a third transistor, the second transistor and the third transistor being connected to the external biasing control unit.

A stage with only three transistors may be provided for managing the biasing of the photodetector and changing from a DI mode to a BDI mode and vice versa.

In the first operating mode, the signals in the first set of biasing signals may be designed so as to make the third transistor function as a closed switch while making the second transistor function as an open switch and making the second transistor inoperative by isolating it from the rest of the first stage.

Advantageously, in the first operating mode, an electrode of the second transistor may be left floating. In this way it is ensured that no current passes through the second transistor.

In the second operating mode, the second transistor and the third transistor may implement a current amplifier.

Advantageously, in the second configuration, the control unit applies a negative potential to an electrode of the second transistor. Using such a negative biasing rather than for example an earthing, a voltage dynamics gain at the terminals of the capacitive load can be obtained, which can make it possible to improve the signal-to-noise ratio.

According to one embodiment, the biasing control unit includes a circuit portion able to form a current mirror. In this case, in the second configuration, the third transistor forms, with said circuit portion, this current mirror, so as to copy a current generated by said circuit portion of the control unit.

The external biasing control unit may be provided with a plurality of outputs to which the biasing signals forming a set of biasing signals are respectively sent, and with at least one switching circuit including a plurality of switches, the switching circuit making it possible to selectively connect each output to one or more channels in a plurality of channels to which biasing potentials are applied, one or more given switches in said plurality of switches having respective states, open or closed, differing between said first configuration and said second configuration.

A particular embodiment provides for allocating, to one or more detection elements of an imager, a type DI biasing mode and, concomitantly with one or more other detection elements of the imager, a biasing mode of the BDI type.

Thus, according to one possibility of implementation for which a plurality of detection elements are situated in a first region of a matrix of detection elements, a first set of biasing signals is sent by said biasing control unit to this plurality of detection elements, while, to a second plurality of detection elements of the imager situated in a second region of the matrix of detection elements, a second set of biasing signals distinct from the signals in the first set are applied concomitantly.

According to one possibility of implementation of the device comprising another external biasing control unit, said other external biasing control unit being coupled to said second plurality of detection elements and able to apply said second set of biasing signals to the respective reading pixels of said second set of detection elements.

According to a particular aspect, the invention relates to a cooled infrared imager comprising an imaging device as defined above.

BRIEF DESCRIPTION OF THE DRAWINGS

The present invention will be better understood on the basis of the following description and the accompanying drawings, on which.

Identical, similar or equivalent parts of the various figures bear the same numerical references to as to facilitate passing from one figure to another.

The various parts shown in the figures are not necessarily shown to a uniform scale, in order to make the figures more legible.

DETAILED DESCRIPTION OF PARTICULAR EMBODIMENTS

Figure 1:
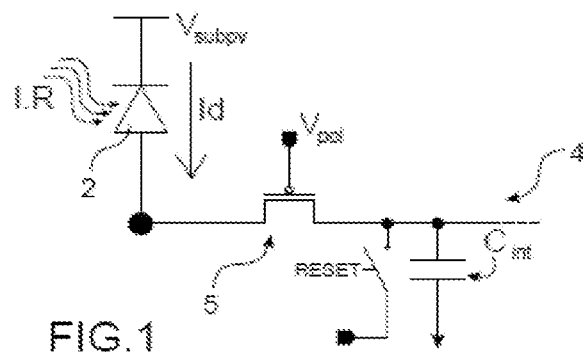
FIG. 1 serves to illustrate, in an infrared imager, an example of a reading pixel of the DI (direct injection) type.
Figure 2:
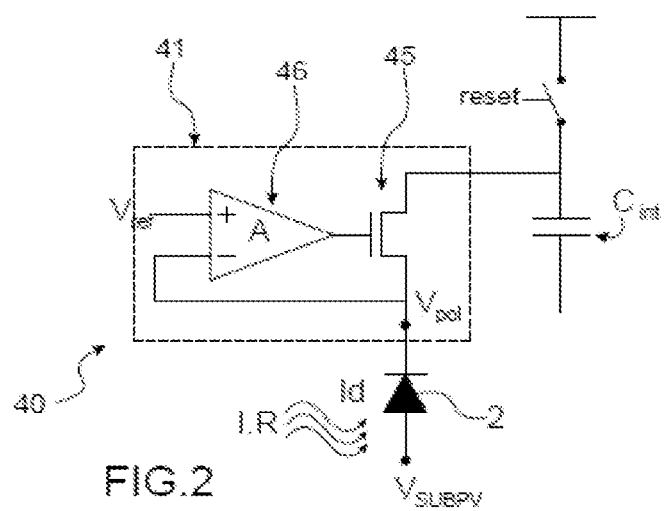
FIG. 2 serves to illustrate, in an infrared imager, an example of a reading pixel of the BDI (buffered direct injection) type.
Figure 3:
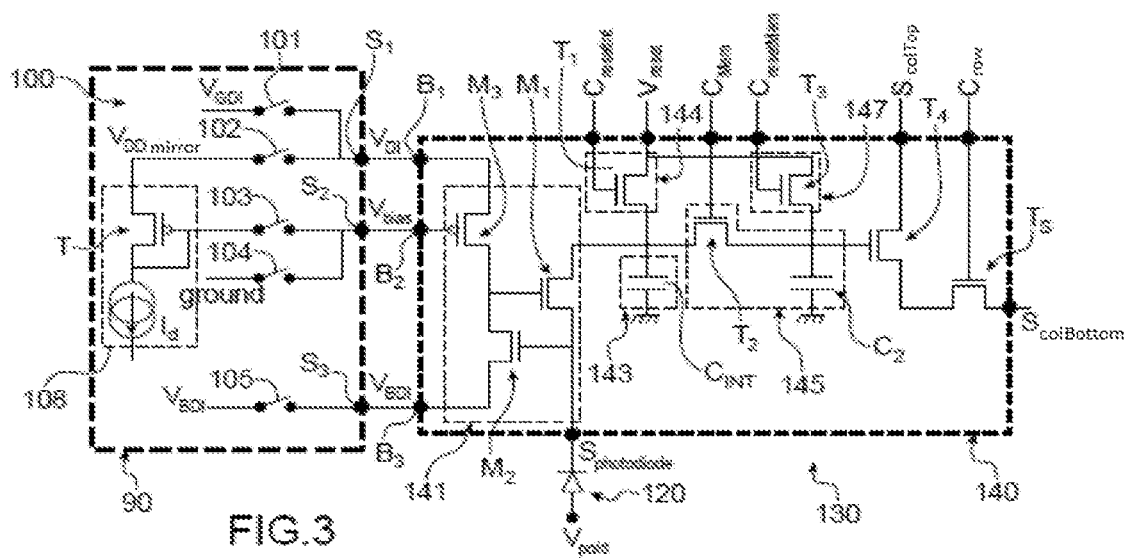
FIG. 3 serves to illustrate an example of an infrared imaging device associating, with a reading pixel of a photodetection element, a reconfigurable external biasing control unit being caused to make this reading pixel change from an operating mode of the DI type to an operating mode of the BDI type and vice versa.

An example of a structure of a reading circuit 140 of an infrared imager as used in accordance with one embodiment of the present invention is given in FIG. 3.

The reading circuit 140, also called a "reading pixel", is connected to a photodetector such as a photodiode 120, which transforms infrared radiation into an electric current. The photodiode 120 and the associated reading circuit 140 form a detection element 130. The imager generally has a plurality of detection elements 130 that can be arranged in a matrix, of one or more rows of detection elements.

The photodiode 120 is typically reverse biased and delivers to the reading circuit 140 a current representing a scene observed. The photodiode 120 may in particular be produced in a substrate made from type III-V material, for example InP, GaAs, InGaAs or InSb, or of type II-VI, for example HgCdTe, and may be attached to the reading circuit 140 in accordance with an assembly that is currently referred to as "hybridisation". The reading circuit 140 and the photodiode 120 are then connected mechanically and electrically, for example by means of metal beads.

In order to bias the photodiode 120, a potential Vpold is applied to one of the terminals thereof, while the other terminal Sphotodiode is coupled to a stage 141 of the reading circuit 140, in the form of a transistor circuit. In this example, the stage 141 is formed solely by three transistors M1, M2, M3. The potential Vpold is advantageously a potential that remains fixed from one reading to the other of the current of the photodiode.

The transistors M1, M2, M3, according to the way in which they are themselves biased and the operating mode that they adopt accordingly, make it possible to adjust the biasing to a terminal Sphotodiode of the photodiode 120 as well as the input impedance Rin of the reading circuit 140. The biasing of the transistors M1, M2, M3, which determines the biasing of the photodiode 120 and the input impedance Rin of the reading circuit 140, is here intended to be modulated. One particularity of this device in fact lies in the fact that the biasing of the transistors M1, M2, M3 is caused to be modified after design of the imager and when the latter is in operation by modifying the biasing potentials applied to terminals B1, B2, B3, of the reading circuit 140. In this way, the stage 141 is able to adopt different operating modes corresponding to different biasing modes applied to the photodiode.

In this example embodiment, the stage 141 has a first transistor M1 connected to the photodiode 120 and called a direct injection transistor. This first transistor M1 makes it possible to read the signal delivered by the photodiode 120 and to maintain a suitable biasing on the photodiode 120 during an integration of current coming from the photodiode 120. The first transistor M1 is in this example embodiment an n-type transistor, in particular an NMOS transistor, an electrode of which, in particular the drain, is connected to an integration capacitive load 143, and another electrode of which, in particular the source, is connected to the photodiode 120. The capacitive load 143 is for example formed by a capacitor Cint.

The stage 141 is here also formed by a second transistor M2, and a third transistor M3 which, in this example embodiment, respectively of the n-type, in particular an NMOS, and of p-type, in particular a PMOS. The transistors M2 and M3 have a common electrode, in this example a drain electrode, which is connected to the gate of the direct injection transistor M1. In the example embodiment illustrated in FIG. 3, the source and the gate of the third transistor M3 are connected respectively to the terminal B1 and to the terminal B2. The second transistor M2 for its part has in this example a source connected to the terminal B3 and a gate connected to the Sphotodiode terminal of the photodiode 120.

The transistors M2 and M3 are connected to the terminals B1, B2, B3 to which biasing signals intended for the stage 141 are intended to be applied and which come from outputs S1, S2, S3 of a biasing signal control unit 90.

The control unit 90 can be configured to apply biasing signals to the respective reading circuits 140 and in particular to the stages 141 with respective transistors of a plurality of detection elements 130.

Figure 4:
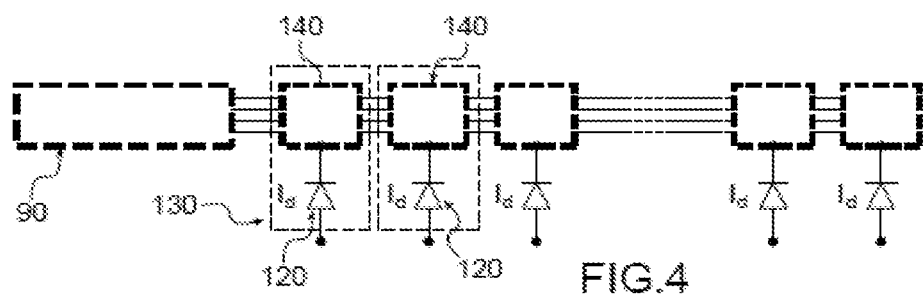
FIG. 4 serves to illustrate a particular arrangement of the external biasing control unit situated at one end of a row of detection elements.

In the particular example embodiment illustrated in FIG. 4, the biasing control unit 90 is situated at the edge of a row, for example a horizontal row (also called a line), of detection elements 130 and applies biasing signals to the respective reading circuits 140, and in particular to the stages 141 with respective transistors of the detection elements 130 in this row.

As indicated above, one particularity of the device lies in the fact that the stage 141 of the reading circuit 140 can adopt a plurality of operating modes and in particular alternate between two operating modes.

In the example embodiment illustrated, the reading circuit 140 can pass from a biasing mode of the direct injection or DI type to a biasing mode of the buffered direct injection or BDI type and vice versa. Passage from one operating mode to another, in other words from one biasing mode to the other of the photodiode 120 (DI to BDI or BDI to DI) is here performed without necessarily having to add a component or components and in particular an additional transistor, by modifying the way in which the stage 141, here formed from three transistors, is biased.

The passage from one operating mode to another is implemented by means of biasing signals at the terminals B1, B2, B3 sent by the control unit 90. The control unit 90 is in particular designed to transmit a first series of biasing signals to the terminals B1, B2, B3 of the stage 41 in order to place the reading circuit in a DI biasing mode and to transmit to the terminals B1, B2, B3 a second series of biasing signals, different from the first series, to the stage 41 in order to place the reading circuit 140 in a BDI biasing mode.

A reconfigurability of the reading pixel 140 is provided here without adding an additional transistor in this pixel. The management of the switching from one operating mode to another is offset at the periphery of the matrix of pixels, for example at the end of a row or at the end of a column.

In order to provide this reconfigurability in one embodiment it is possible typically to make provision for providing the control unit 90 with at least one switching circuit 100. The switching circuit 100 is in this example provided with switches 101, 102, 103, 104, 105 that, according to the respective states thereof, closed or open (on or off), make it possible to alternately connect an output S1, S2, S3 to a biasing channel or to disconnect an output S1, S2, S3 from a biasing channel.

When a first switch 101 is in a closed state (and a second switch 102 is open), this switch 101 makes it possible for example to connect the output S1 to a biasing channel to which a first supply potential $V_{GDI}$ is applied.

When the second switch 102 is open (and the first switch 101 is closed) this makes it possible for example to connect the output S1 to a biasing channel over which a potential VDDmirror is sent. This potential VDDmirror is for example delivered by a circuit portion 108 of the control unit 90 able to form a current mirror.

When a third switch 103 is closed (and a fourth switch 104 is open), this makes it possible for example to connect the output S2 to a biasing channel corresponding to a gate potential of a transistor T of the circuit portion 108.

In the closed state (and when the third switch 103 is open), the fourth switch 104 makes it possible for example to connect the output S2 to earth.

In the closed state, a fifth switch 105 makes it possible for example to connect the output S3 to a biasing channel to which a supply potential $V_{BDI}$ is applied.

In the open state, the fifth switch 105 makes it possible to leave the output S3 floating and the terminal B3 connected to this output S3 also floating.

The external biasing control unit 90 and in particular the switching circuit 100 thereof is thus reconfigurable according to signals (not shown) controlling opening or closing of the switches 101, 102, 103, 104, 105.

Figure 5A:
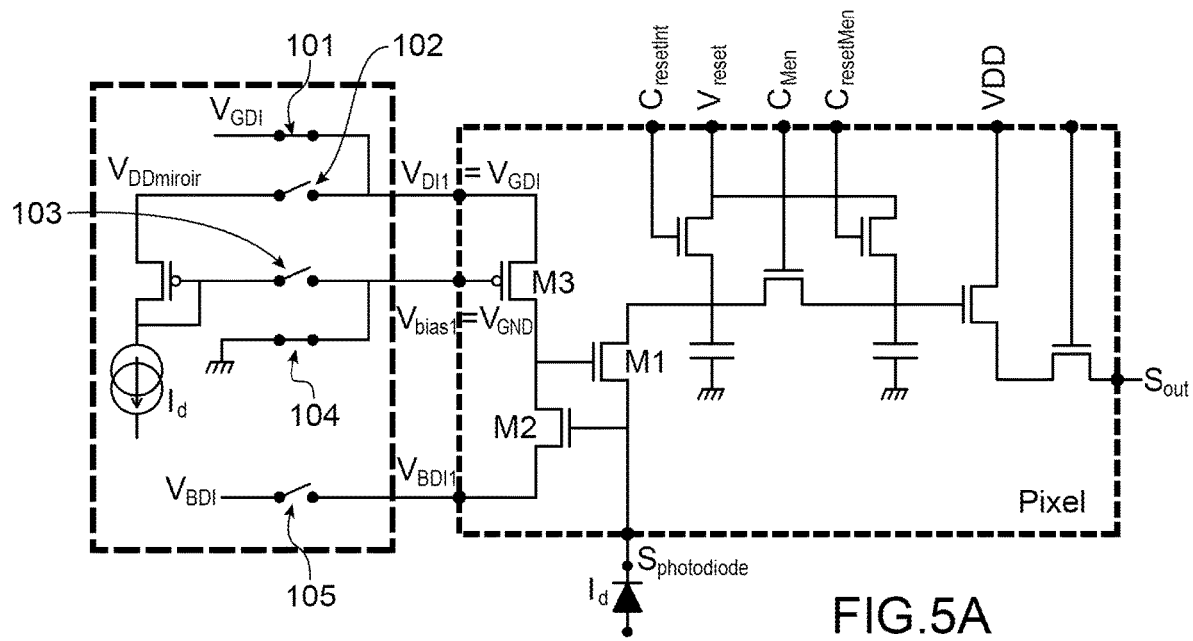
FIG. 5A serves to illustrate a first configuration of a switching circuit of the biasing control unit for making the reading circuit adopt an operating mode of the DI type.
Figure 5B:
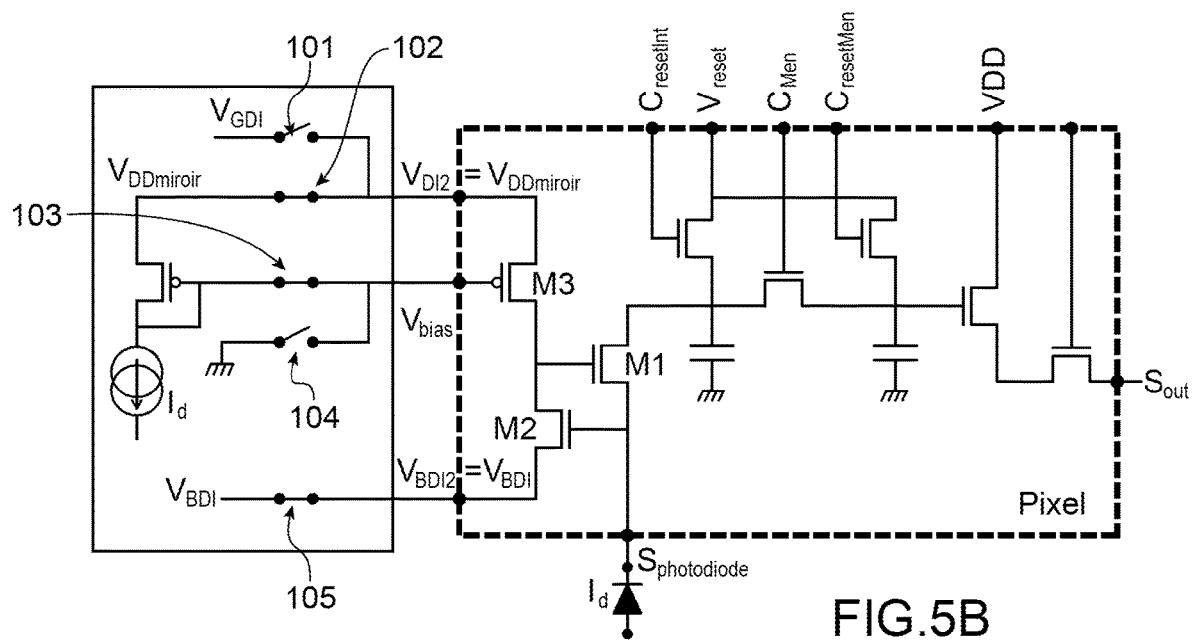
FIG. 5B serves to illustrate a second configuration of a switching circuit of the biasing control unit for making the reading circuit adopt an operating mode of the BDI type.

The FIGS. 5A, 5B illustrate two distinct configurations of the biasing control unit 90.

A first configuration (FIG. 5A) of the switching circuit 100 in which the switches 101, 102, 103, 104, 105 are respectively in a closed, open, open, closed, open state, makes it possible to send a set of biasing signals VDI1=VGDI, Vbias1=VGND, VBDI1=VBDI to the terminals B1, B2, B3 connected to the transistor stage 141. In this first configuration, the stage 141 of the reading circuit is biased so that it adopts a direct injection (DI) operating mode (corresponding to a biasing mode of the photodiode).

The potentials VDI1=VGDI, Vbias1=VGND applied respectively to the source and to the gate of the third transistor M3 are designed so that this transistor M3 functions as a switch, the transistor M3 being switched on so as to convey the voltage $V_{GDI}$ to the gate of the first direct injection transistor M1. VGDI is in this example a positive potential that may for example be around 1V. The open state of the fifth switch 105 in the switching circuit 100 makes the terminal B3 floating, which makes it possible to ensure that the second transistor M2 functions as an open switch and thus left inoperative in the stage 141.

By making the terminal B3 floating, it is thus made possible to ensure that no additional current circulates through this transistor M2 and that the gate of the direct injection transistor is solely biased by means of the potential $V_{DI}$. In this DI operating mode, the injection transistor M1, which is mounted in cascade, receives a fixed potential on its gate. The biasing of the transistors M1, M2, M3 is then such that the input resistance of the reading circuit 140 has a first value.

A second configuration (FIG. 5B) of the switching circuit 110 in which the switches 101, 102, 103, 104, 105 are respectively in an open, closed, closed, open, closed state, makes it possible to send a set of biasing signals VDI2=VDDmirror, Vbias2, VBDI2=VBDI to the terminals B1, B2, B3 connected to the transistor stage 141. In this second configuration, the stage 141 of the reading circuit is biased so that it adopts an operating mode corresponding to a mode of the biasing of the photodiode in buffer direct injection (BDI).

The potentials VDI2=VDDmirror, Vbias2, VBDI2=VBDI are designed so that the transistors M2, M3 form a current amplifier. The third transistor M3 is here biased so as to form a current source. This current source results from the fact that, in this example embodiment, the second configuration is such that the portion 108 of the control unit and the third transistor M3 form a current-mirror circuit. The potential Vbias2 in this example applied to the gate of the third transistor M3 connected to the circuit portion 108 makes it possible to fix the current of the amplifier implemented by the transistors M2, M3.

In this second configuration, a potential VBDI2=VBDI is applied to the source of the second transistor M2. This potential VBDI can in this example be designed so as to be equal to the earth potential GND or preferably be a negative potential.

In BDI mode, rather than connecting the terminal B3 to earth, by addressing a negative voltage on the source of the second transistor M2 the voltage dynamics of the capacitive load 143 is improved. This gain in voltage dynamics is particularly significant when the imager is of the cooled type and affords improvement to the signal-to-noise ratio.

In the BDI operating mode, because the transistor M2 is this time made operative, a negative feedback is applied to the gate of the first transistor M1 and a negative-feedback biasing of a terminal of the diode is implemented. The biasing of the transistors M1, M2, M3 is such that the input resistance has in this BDI mode a second value lower than the first input resistance value in the DI mode but also a corresponding current consumption higher than in the first configuration.

In a reading circuit 140 such as the one illustrated in FIG. 3, apart from the stage 141, the functioning of which has just been described, the rest of the reading circuit 140 can follow a more conventional structure.

Thus, the stage 143 forming a capacitive load and making it possible to integrate the current coming from the photodiode 120 is in the example illustrated coupled to a reset stage 144 of the capacitive load 143. This stage 144 is controlled by a signal CresetInt and may comprise a transistor T1 that in this example is switched on when it is wished to drain the charges stored by the capacitor Cint.

A storage stage 145 is coupled to the capacitive load 143 and serves to duplicate a voltage value at the terminals of the integration capacitor once the integration period has elapsed.

In this example, the storage stage 145 is provided with a transistor $T_2$, functioning as a switch controlled by a signal $C_{Mem}$, arranged between the integration capacitor and a storage capacitor $C_2$. To make it possible to drain the charges stored by the storage capacitor and to reset the voltage value stored at the terminals of this capacitor $C_2$, another reset stage 147 may be provided. This other stage 147 is in this example formed by a switching transistor $T_3$ that is switched on by means of a signal CresetMem in order to discharge the capacitor $C_2$, once the stored voltage value has been transferred.

The reading circuit 140 is also provided with a follower transistor $T_4$ and a row-selection transistor $T_5$. The transistors $T_4$ and $T_5$ are in this example also of n-type, in particular NMOS.

The reading circuit 140 of this particular example embodiment has a structure of the IWR (integrate while read) type, which, because of the presence of the storage stage, enables it to perform an integration while a reading of a signal value resulting from a previous integration is being carried out.

It is however possible to make provision for associating the stage 141 with transistors M1, M2, M3 making it possible to vary the input impedance Rin, with another type of structure downstream of the capacitive load 143 or with a capacitive load with a structure different from that of the example illustrated.

A reading circuit 140 has described previously in relation to FIGS. 3, 4, 5A-B, and provided with a stage 141 with transistors M1, M2, M3, respectively of n-type, n-type and p-type, applies in particular to a so-called p-on-n photodiode 120, that is to say provided with a p region surmounted by an n region to which the stage 141 of the reading circuit is connected, in particular to which the source of the first transistor M1 and the gate of the second transistor M2 are connected.

Figure 6:
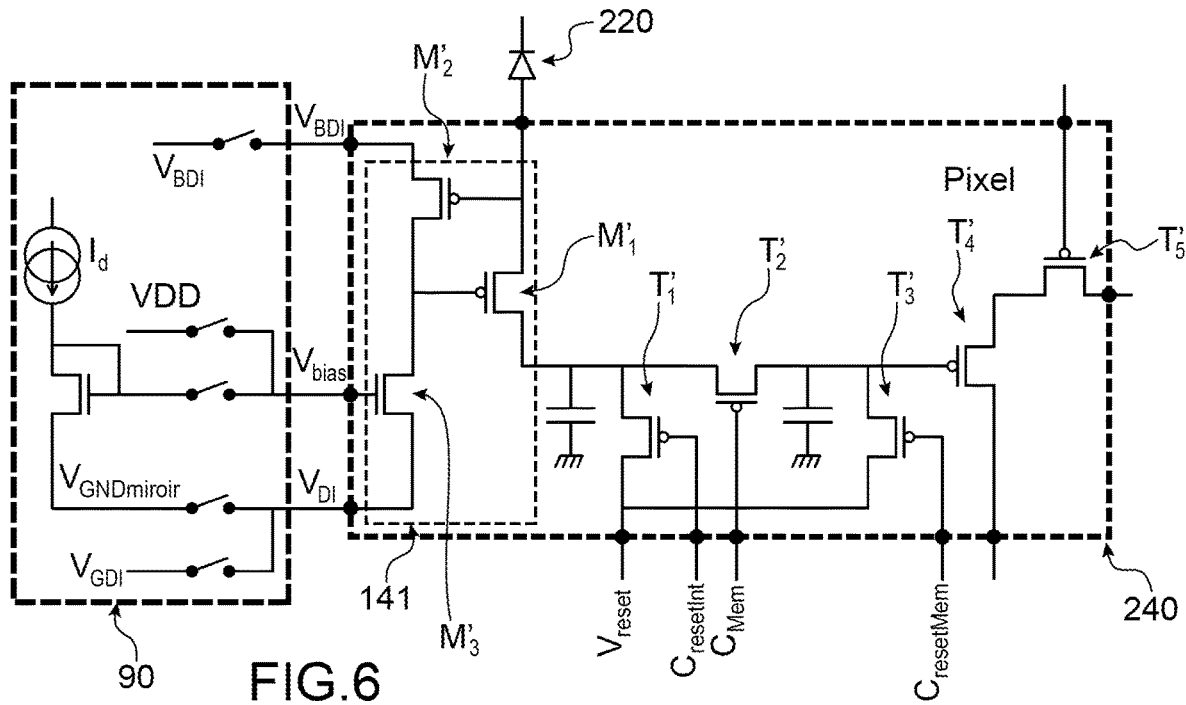
FIGS. 6 and 7 serve to illustrate a variant arrangement of the reading circuit adapted to a connection thereof to a p-region of a p-on-n photodiode.
Figure 7:
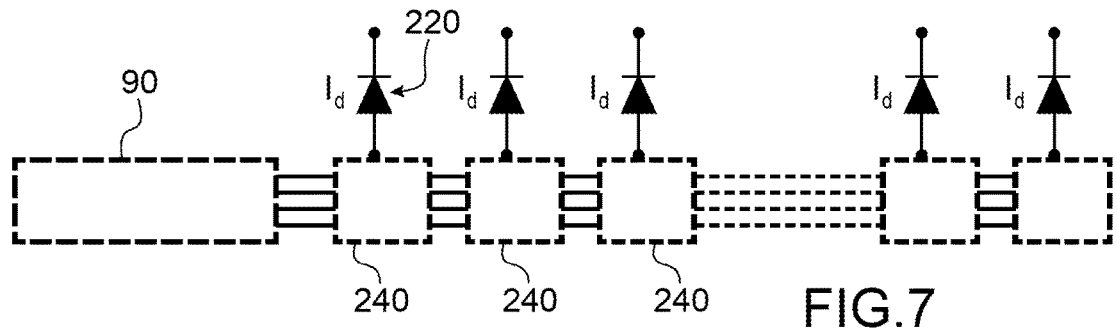

A variant arrangement of a reading circuit 240 adapted this time to a so-called n on p photodiode 220, in other words provided with an n region surmounted by a p region to which the reading circuit is connected, is given in FIGS. 6 and 7. The transistor stage 241 the biasing mode of which is able to be modified to make it possible to adapt the DI and BDI operating modes, is also composed of three transistors M'1, M'2, M'3. This time the first transistor M'1 is of the p-type, for example PMOS. The gate of this transistor M'1 is connected to a common electrode between a second p-type transistor M'2, in particular PMOS, and a third n-type transistor M'3, in particular NMOS.

The transistor $T'_1$ of the reset stage of the integration capacitor, $T'_2$ of the storage stage, $T'_3$ resetting the storage capacitor, as well as the transistors $T'_4$, $T'_5$ for selecting column and row, are of the type opposite to that of the type previously described, and in this example p-type, in particular PMOS.

FIG. 7 shows, for this variant, the biasing control unit 90 at the edge of a row or line and making it possible to adapt the DI or BDI biasing mode connected to the respective reading circuits or reading pixels 240 of the detection elements of this row. In this example, the same biasing mode is imposed on the reading pixels in the same row, this biasing mode optionally being able to be shared by all the rows of the matrix.

In a variant, provision can be made for imposing an operating mode, in particular DI or BDI, on a region of an imager while at the same time another region of this imager is subjected to another different operating mode, BDI or DI.

Figure 8A:
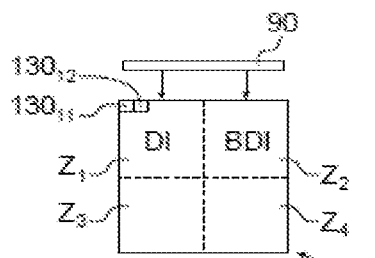
FIG. 8A serves to illustrate a particular embodiment wherein an imager is provided with detection elements functioning in DI mode and other detection elements functioning concomitantly in BDI mode.

In the particular example embodiment illustrated in FIG. 8A, a first region Z1 of a matrix of detection elements $130_{ij}$ is thus subjected to a DI mode, while the BDI mode is imposed on another region Z2 of this matrix. Thus adjacent or neighbouring elements $130_{11}$ and $130_{12}$ of the same region Z1 may each be put in DI mode, while adjacent or neighbouring elements (not referenced in the figure) of the first region Z2 may each be put in BDI mode.

Thus the respective reading circuits of the detection elements of the first region Z1 are subjected to a set of biasing signals VDI1, VBIAS1, VBI1 different from the signals VDI2, VBIAS2, VBI2 biasing the respective reading circuits of the detection elements of the second region Z2.

The second region Z2 may be a region of the imager corresponding to a region of the scene for which the image quality is privileged, the first region Z1 corresponding to an image region of lower quality. In the example illustrated in FIG. 8A, the two sets of biasing signals VDI1, VBIAS1, VBI1, VDI2, VBIAS2, VBI2 allocated respectively to the first region Z1 and to the second region Z2 come from the same biasing control unit 90 external to the matrix M of detection elements.

Figure 8B:
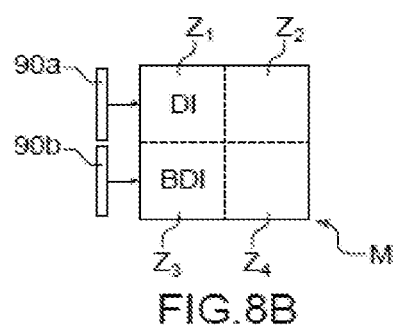
FIG. 8B serves to illustrate an imager provided with a region functioning in DI mode and another region functioning concomitantly in BDI mode, these regions having their respective operating modes DI or BDI imposed by separate biasing control units.

Provision can also be made, as with the variant illustrated in FIG. 8B, for a device with a plurality of separate control units 90a, 90b. In this case a first control unit 90a can be configured to apply biasing signals to a region Z1, in order to cause it to adopt a particular operating mode selected among a plurality of operating modes, in particular between a DI or BDI functioning, while a second control unit 90b is configured to apply biasing signals to another region Z3, and to cause it to adopt a given operating mode between a plurality of operating modes, in particular between a BDI or DI functioning.

An external reconfigurable biasing control unit as described in one or other of the embodiments may be provided with or associated with a controller for imposing on the switching circuit or circuits the respective configuration or configurations thereof.

Figure 9:
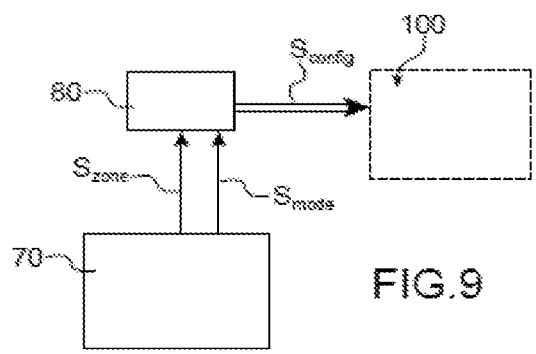
FIG. 9 serves to illustrate a digital system wherein the biasing control unit and in particular the configuration of the switching circuit thereof is itself controlled by a controller.

A particular arrangement illustrated in FIG. 9 provides a controller 80 external to the imager or to the chip containing the imager, or integrated on the chip. This controller 80 may be a circuit provided with at least one logic unit, or for example in the form of a microprocessor or an ASIC (application-specific integrated circuit) caused to modify the configuration of the switching circuit or circuits by means of configuration signals Sconfig.

The controller 80 may itself be controlled by a digital control system 70 sending for example at least one signal Szone selecting a given imager region, a signal Smode relating to a selection of a given operating mode, DI or BDI, and a signal $S_{zone/mode}$ associating with a given imager region a given operating mode chosen in particular between DI and BDI.

The choice of a given operating mode, DI or BDI, to a given imager region may depend on the resolution level that it is wished to allocate to this given region, this allocation itself being able to depend on a discrimination made between at least one region of interest and at least one other region of less interest identified in a scene detected by the imager.

The control system 70 may for example be in the form of a data processor, integrated or not on the chip, or a computer intended to receive data for defining one or more regions of interest on an imaged scene in order to generate a signal making it possible to allocate, to at least one region of the matrix, a BDI operating mode and, to another region of the matrix, a DI operating mode for which the precision of detection is lower but where the current consumption is reduced.

One or other of the example embodiments described above applies in particular to infrared imagers that are cooled and therefore provided with a device for cooling the matrix, in particular a fluidic device where a cooling fluid is circulated in order to keep the imager at a low operating temperature, for example below 150 K.

The device according to the invention applies in particular to cooled infrared imagers provided with photodetectors designed to function at "high" temperatures, for example between 130 K and 150 K, but for which the resistance $R_{shunt}$ is low. The device according to the invention also advantageously applies to so-called "low flow" applications, of around tens of picoamperes or less.

The invention claimed is:

1. An infrared imaging device including a set of detection elements, each detection element in the set of detection elements comprising a photodetector associated with and connected to a corresponding reading pixel configured to read a signal generated by the photodetector, the reading pixel being provided with an integration capacitive load for storing charges coming from the photodetector, the reading pixel comprising a first stage coupled to the photodetector and to the integration capacitive load, the first stage being provided with transistors to bias the photodetector, the infrared imaging device comprising a biasing control circuit, the biasing control circuit being configured to apply, to the first stage of the reading pixel, a set of biasing potentials, the biasing control circuit being reconfigurable so as to be able to pass from a first configuration to a second configuration and from the second configuration to the first configuration, the first configuration being a configuration wherein the biasing control circuit is configured to send a first set of biasing signals to the first stage so that the first stage adopts a first operating mode corresponding to a first biasing mode of the photodetector, the second configuration being a configuration wherein the biasing control circuit is configured to send a second set of biasing signals to the first stage, the second set of biasing signals being different from the first set of biasing signals and designed so that the first stage adopts a second operating mode corresponding to a second biasing mode of the photodetector, the first biasing mode of the photodetector being a direct-injection biasing mode for which a set of transistors of the first stage are biased so that the reading pixel has a first input impedance, the second biasing mode of the photodiode being a buffer direct injection biasing mode of the photodetector for which the set of transistors of the first stage are biased so that the reading pixel has a second input impedance lower than the first impedance, wherein each detection element of the set of detection elements comprises the corresponding reading pixel, and the biasing control circuit is external to the set of detection elements.

2. The infrared imaging device according to claim 1, wherein the first stage comprises a first direct-injection transistor connected to the photodetector and to the integration capacitive load, the first transistor being connected to a common electrode of a second transistor and of a third transistor, the second transistor and the third transistor being arranged so as to receive biasing signals from the external biasing control circuit.

3. The infrared imaging device according to claim 2, wherein, in the first operating mode, the first set of biasing signals causes the third transistor to function as a closed switch while causing the second transistor function as an open switch.

4. The infrared imaging device according to claim 3, wherein, in the first operating mode, an electrode of the second transistor is left floating.

5. The infrared imaging device according to claim 2, wherein, in the second operating mode, the second transistor and the third transistor form a current amplifier.

6. The infrared imaging device according to claim 5, wherein, in the second configuration, the biasing control circuit applies a negative potential to an electrode of the second transistor.

7. The infrared imaging device according to claim 2, wherein the external biasing control circuit includes a circuit portion configured to form a current mirror, and wherein, in the second configuration, the third transistor forms with the circuit portion the current mirror, so as to copy a current generated by the circuit portion of the biasing control circuit.

8. The infrared imaging device according to claim 1, wherein the external biasing control circuit comprises a plurality of outputs to which the first and second sets of biasing signals are respectively sent, the external biasing control circuit further comprising at least one switching circuit including a plurality of switches, the switching circuit making it possible to selectively connect each output to one or more channels in a plurality of channels to which biasing potentials are applied, one or more given switches in the plurality of switches having respective states, open or closed, that are different between the first configuration and the second configuration.

9. The infrared imaging device according to claim 1, wherein the set of detection elements is situated in a first region of a matrix of detection elements, and wherein the first set of biasing signals is sent by the external biasing control circuit to the set of detection elements, the infrared imaging device comprising a second set of detection elements situated in a second region of the matrix of detection elements, and wherein the second set of biasing signals distinct from the signals in the first set of signals is applied to the second set of detection elements.

10. The infrared imaging device according to claim 9, further comprising another external biasing control circuit, the another external biasing control circuit being coupled to the second set of detection elements and configured to apply the second set of biasing signals to the respective reading pixels of the second set of detection elements.

11. A cooled infrared imager comprising the device according to claim 1.

12. An infrared imaging device including a set of detection elements, each detection element in the set of detection elements comprising a photodetector associated with and connected to a corresponding reading pixel configured to read a signal generated by the photodetector, the reading pixel being provided with an integration capacitive load for storing charges coming from the photodetector, the reading pixel comprising a first stage coupled to the photodetector and to the integration capacitive load, the first stage being provided with transistors to bias the photodetector, the infrared imaging device comprising a biasing control circuit, the biasing control circuit being configured to apply, to the first stage of the reading pixel, a set of biasing potentials, the biasing control circuit being reconfigurable so as to be able to pass from a first configuration to a second configuration and from the second configuration to the first configuration, the first configuration being a configuration wherein the biasing control circuit is configured to send a first set of biasing signals to the first stage so that the first stage adopts a first operating mode corresponding to a first biasing mode of the photodetector, the second configuration being a configuration wherein the biasing control circuit is configured to send a second set of biasing signals to the first stage, the second set of biasing signals being different from the first set of biasing signals and designed so that the first stage adopts a second operating mode corresponding to a second biasing mode of the photodetector, the first biasing mode of the photodetector being a direct-injection biasing mode for which a set of transistors of the first stage are biased so that the reading pixel has a first input impedance, the second biasing mode of the photodiode being a buffer direct injection biasing mode of the photodetector for which the set of transistors of the first stage are biased so that the reading pixel has a second input impedance lower than the first impedance, each detection element of the set of detection elements comprises the corresponding reading pixel, the biasing control circuit is external to the set of detection elements, the first stage comprises a first direct-injection transistor connected to the photodetector and to the integration capacitive load, the first transistor being connected to a common electrode of a second transistor and of a third transistor, the second transistor and the third transistor being arranged so as to receive biasing signals from the external biasing control circuit, and in the second configuration, the biasing control circuit applies a negative potential to an electrode of the second transistor.

* * * * *